No. 746,704. PATENTED DEC. 15, 1903.
J. HOVEY.
CORN HUSKER.
APPLICATION FILED APR. 7, 1902.
NO MODEL. 5 SHEETS—SHEET 1.

Witnesses
Jos. H. Blackwood
S. H. Randolph, Jr.

Inventor
Joseph Hovey
by D. A. Gourick
Attorney

No. 746,704. PATENTED DEC. 15, 1903.
J. HOVEY.
CORN HUSKER.
APPLICATION FILED APR. 7, 1902.
NO MODEL. 5 SHEETS—SHEET 2.

No. 746,704. PATENTED DEC. 15, 1903.
J. HOVEY.
CORN HUSKER.
APPLICATION FILED APR. 7, 1902.
NO MODEL. 5 SHEETS—SHEET 3.
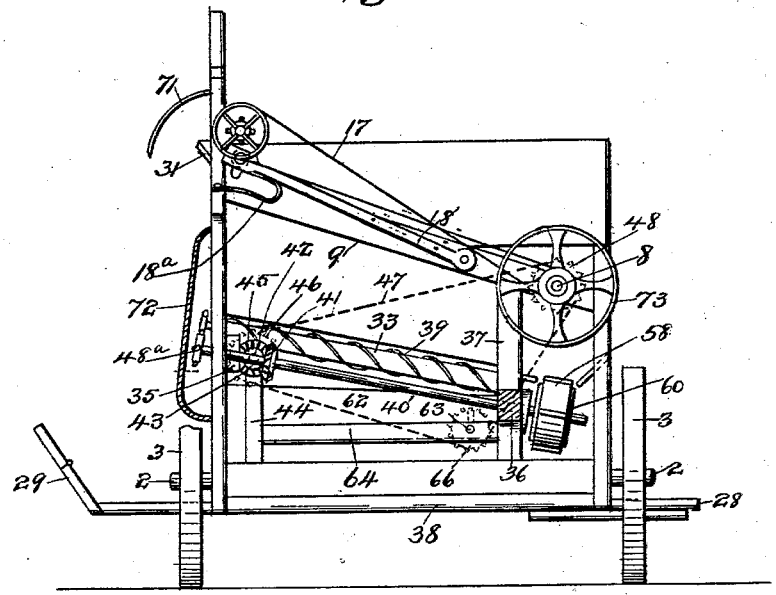
Fig. 3.
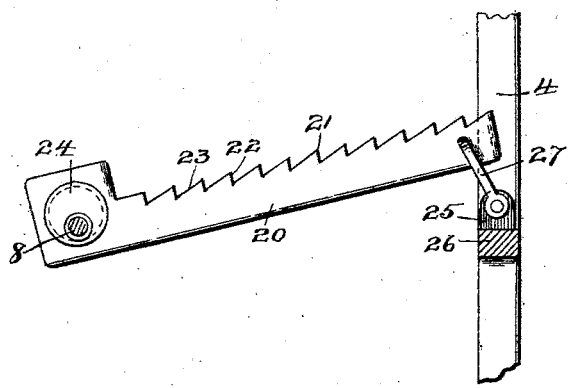
Fig. 4.
Fig. 10.
Witnesses
Jos. H. Blackwood
V. Randolph Jr.
Inventor
Joseph Hovey
by S. A. Gorrick
Attorney No. 746,704. PATENTED DEC. 15, 1903.
J. HOVEY.
CORN HUSKER.
APPLICATION FILED APR. 7, 1902.
NO MODEL. 5 SHEETS—SHEET 4.

No. 746,704. PATENTED DEC. 15, 1903.
J. HOVEY.
CORN HUSKER.
APPLICATION FILED APR. 7, 1902.
NO MODEL. 5 SHEETS—SHEET 5.
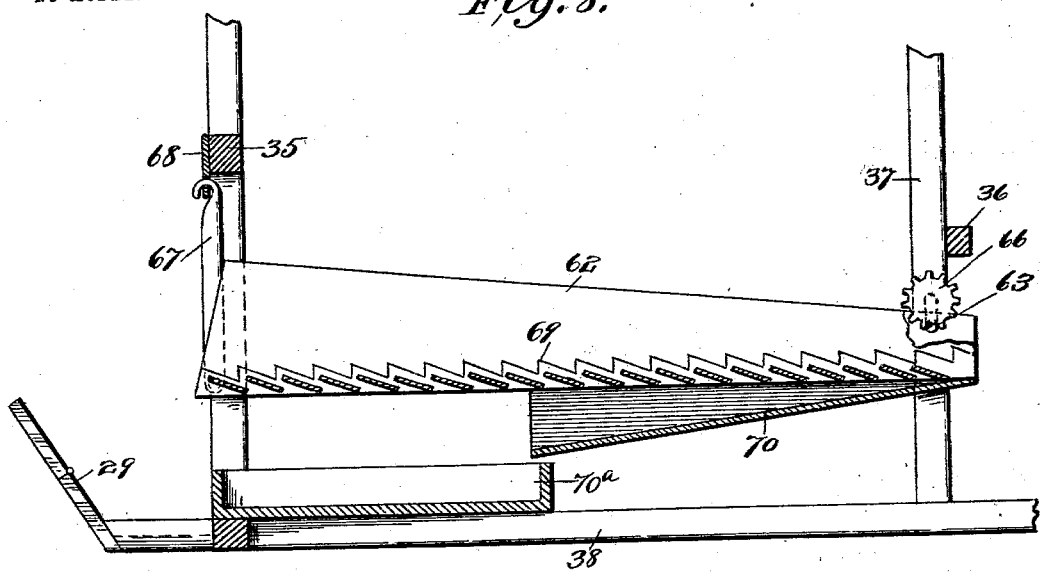
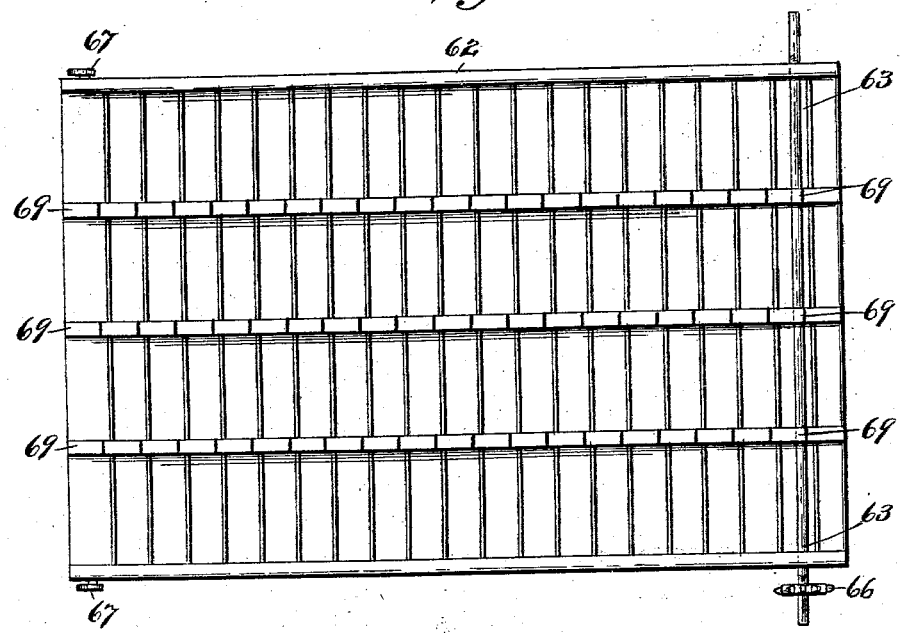
Witnesses
Inventor
Joseph Hovey
Attorney No. 746,704. Patented December 15, 1903.

UNITED STATES PATENT OFFICE.

JOSEPH HOVEY, OF FLORIDA, OHIO.

CORN-HUSKER.

SPECIFICATION forming part of Letters Patent No. 746,704, dated December 15, 1903.

Application filed April 7, 1902. Serial No. 101,774. (No model.)

*To all whom it may concern:*

Be it known that I, JOSEPH HOVEY, a citizen of the United States, residing at Florida, in the county of Henry and State of Ohio, have invented certain new and useful Improvements in Corn-Huskers, of which the following is a specification.

My invention relates to machines for husking corn, and has for one of its objects to provide a mechanism by which the ears of corn are snapped from the stalk and the stalk delivered in its natural condition to a table where it may be bundled for use as fodder.

Another object of my invention is to provide means whereby the husk may be torn from the ear with as little shelling of the corn as possible, the husked ears delivered to one end of the machine where they may be gathered in baskets, &c., while the husks are carried to the same delivery-point as the denuded stalks and may be bound up therewith.

Another object of my invention is to provide means for saving all grains of corn that may be shelled.

A further object of my invention is to provide a machine of the class described that may be used for husking the corn in the field, being drawn from shock to shock in the field, and having a suitable motor for running the machinery.

Further objects of my invention will more fully appear in the description hereinafter, and by reference to the drawings, in which—

Figure 1:
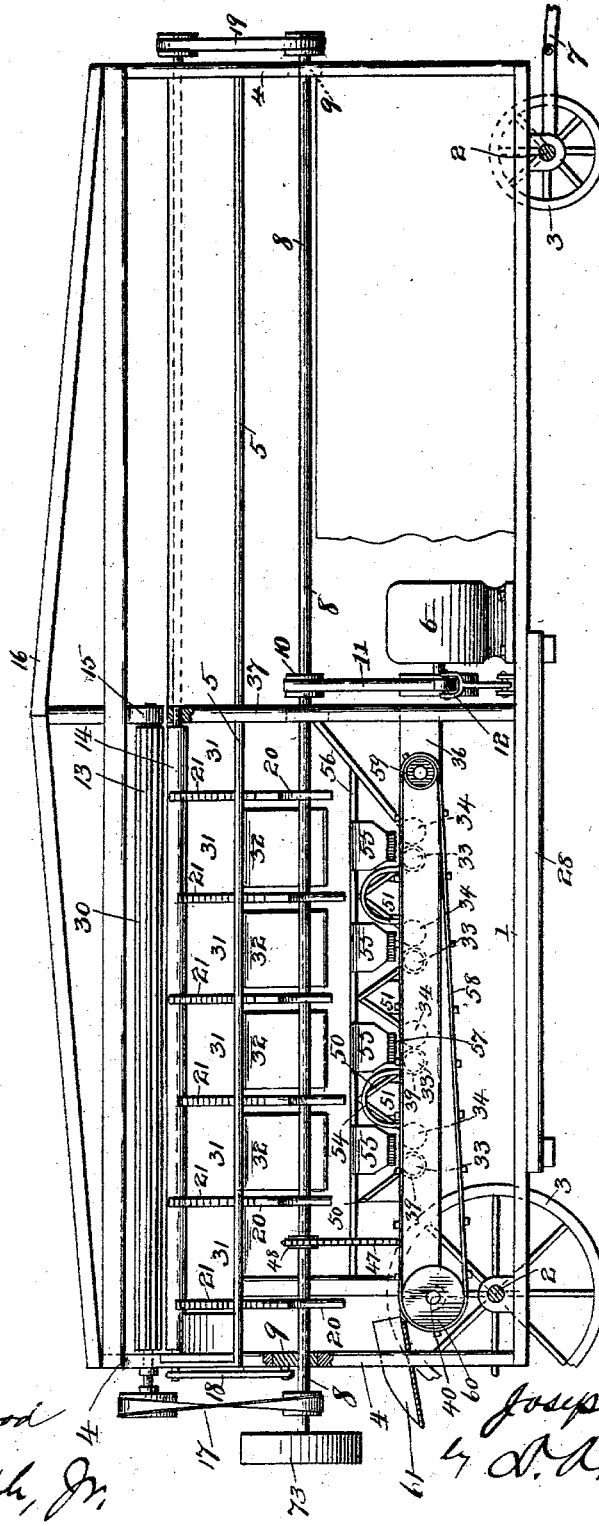
Figure 2:
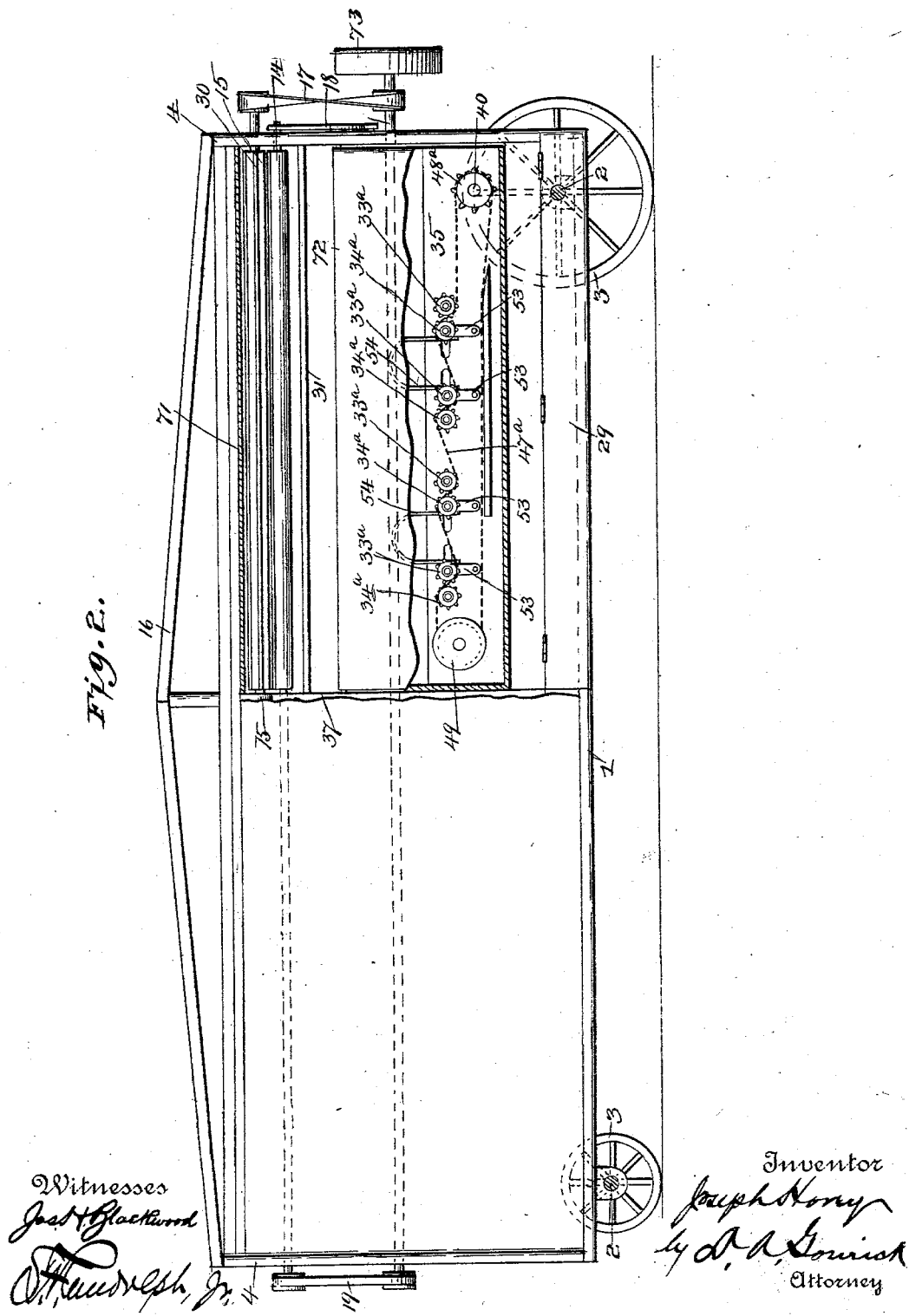
Figure 6:
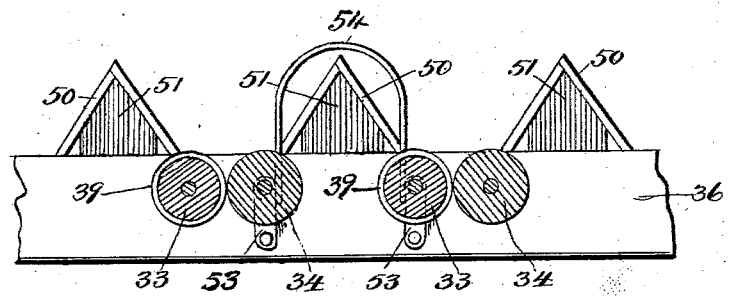
Figure 5:
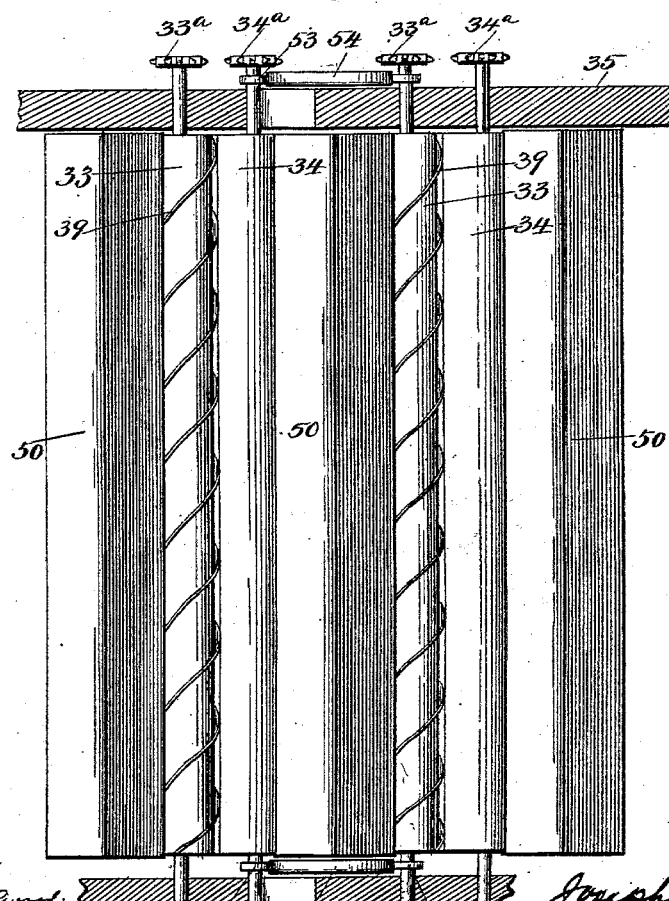

Figure 1 is a front view of my invention; Fig. 2, a rear view; Fig. 3, an end view; Fig. 4, a detail view of one of the feed-bars and means for mounting the same; Fig. 5, a top plan view of the husking-rolls and the parts connected therewith; Fig. 6, a detail view of one set of husking-rolls; Fig. 7, a top plan view of the screen; Fig. 8, a section on the line 8 8 of Fig. 7; Fig. 9, a detail of shaft for operating the screen; and Fig. 10, a section of the feed-bar shown in Fig. 4, taken through the eccentric.

Referring to the drawings, in which similar reference characters indicate corresponding parts throughout the several views, 1 represents pieces of timber forming the base-frame of my machine and which are secured in any suitable manner to the axles 2, on which are journaled the wheels 3. The uprights 4 support a table 5 and other parts of the framework for providing journals, &c., as will appear hereinafter.

6 represents a gasolene or any other suitable motor for operating the husking machinery, it being understood that the machine is moved from shock to shock by draft-animals attached in the ordinary way to a pole 7, secured to the front axle 2.

8 is the main drive-shaft of the machine, suitably journaled on cross-pieces 9, secured to the uprights 4, and has a pulley 10 keyed thereto for receiving a belt 11 from the motor 6.

12 is a belt-tightener for controlling the operation of the machine; but I do not wish to be confined to the use of this device, as it may be found more advantageous to use the ordinary construction of fast and loose pulleys instead.

13 and 14 represent the snapping-rolls mounted above the table 5 at the rear of the machine, the upper roll 13 being journaled in boxings 15, mounted on a suitable trussed frame 16, secured to the tops of uprights 4 at the ends of the frame, and is turned by a belt 17 from the shaft 8, while the lower roll 14 is journaled in arms 18, pivoted to the cross-pieces 9, 18$^a$ being a U-shaped spring to normally hold the roll 14 up against the roll 13. The roll 14 is turned by the belt 19 from the shaft 8.

20 represents feed-bars having teeth 21, each tooth having a vertical surface 22 toward the snapping-rolls and an inclined surface 23 from the direction of the feed. The feed-bars are actuated by means of eccentrics 24 at one end, journaled on the shaft 8, the other end of each arm being supported on a bracket 25, mounted on a beam 26, secured on the uprights 4, each bracket 25 having a link 27 journaled therein, which is in turn journaled in the bar 20. This structure is fully disclosed in Fig. 4.

It will be readily understood that the stalks of corn are fed to the snapping-rolls by the operator, who stands on the platform 28, secured to the base of the frame 1, by throwing the stalks on the feed-bars, which rapidly carry the stalks to the rolls 13 and 14, where the ears are snapped off, while the stalks pass through to drop to a table 29, secured to the base-frame 1 beneath the rolls. It may be found desirable to form one of the rolls with longitudinal ribs 30, shown in this instance on the upper roll, though it may be found more advantageous to have the ribs on the lower roll, so that I do not care to be limited to the ribs on either roll. The purpose of the ribs 30 is to cause an opening and closing motion to the rolls 13 14, which would more readily push the ears off the stalk. After the ears have been snapped from the stalk by the rolls 13 and 14 they drop between the feed-bars 20 and are carried below to the husking-rolls, hereinafter described, 31 being an incline under the roll 14, and 32 representing inclined boards slanting toward the incline 31 to form a trough to feed the ears to said husking-rolls. The husking-rolls are made up of four or more pairs of rolls 33 34, journaled on a beam 35 under the snapping-rolls 13 14, and a beam 36, secured to uprights 37, secured to cross-beams 38 on the base-frame 1. The husking-rolls are inclined toward the feeding side of the machine, as shown, and have one of each pair of rolls provided with a projecting spiral rib 39 to assist in tearing the husk from the ear, as well as urge the husked ear off the rolls.

40 is a shaft journaled in the beams 35 and 36 and having a beveled gear-wheel 41 keyed thereto.

42 is a counter-shaft journaled in a boxing 43 on an upright 44, having a beveled gear 45 meshing with the gear 41 on one end thereof and a sprocket-wheel 46 on the other end, while 47 is a sprocket-chain running from a sprocket-wheel 48 on the shaft 8 around the sprocket-wheel 46 to impart motion to the counter-shaft 42.

47$^a$ is a sprocket-chain actuated by a sprocket-wheel 48$^a$ on the end of the shaft 40 and actuating the husking-rolls 33 34 by running around an idler 49 and downward between pairs of sprocket-wheels 33$^a$ and 34$^a$ on the end of each shaft, the chain 47$^a$ thus following a zigzag path back to the sprocket-wheel 48$^a$.

50 represents boards set at an angle between each pair of husking-rolls 33 34 and at the ends of the husking-section and inclined toward the rolls to insure delivery of the ears of corn to the husking mechanism. The boards 50 are supported at one end by the inclined board 31 and at the other by brackets 51. As it would be obviously desirable to permit the rolls 33 34 to open wider at one time than at another, I journal one of each pair of rolls on a swinging arm 53 at each end and provide a U-shaped spring 54 between each pair of pivotally-journaled rolls at each end thereof.

55 represents a retarder hung over each pair of husking-rolls on a beam 56, secured to the apices of the inclined boards 50 and have pieces of flexible material 57, such as heavy leather, secured to the lower end thereof to slightly hold the ears of corn at the upper end of the roll until husked, when, because of the slippery nature of the husked ear, as well as the spiral rib, hereinbefore described, the ear slips by the retarders and is caught by the endless apron conveyer 58, that is supported at one end by a pulley 59, journaled on the beam 36 and actuated by a pulley 60 on an extension of the shaft 40.

61 is a slide at the end of the conveyer 58 to deliver the husked ear to any desired receptacle.

The construction of the husking-rolls and the parts connected therewith is fully shown in the detail views thereof in Figs. 5 and 6.

After the husks pass between the rolls 33 34 they drop to a shaking-screen 62, which is mounted on one end to a cranked shaft 63, journaled in the upright 37 in the middle of the machine, and a beam 64, secured to the uprights 37 and 44. The shaft 63 is actuated by means of a sprocket-wheel 66, around which the chain 47 is carried after leaving the sprocket-wheel 46, hereinbefore described. The delivery end of the screen 62 is supported by links 67, pivoted thereto and hooked in eyepieces 68, secured to beam 35. The husks are thrown by the screen 62 out onto the table 29, hereinbefore described, where they are bound up with the stalks. To insure the delivery of the husks, I provide the screen with a plurality of ribs 69, having teeth similar in construction to the teeth 21 on the feed-bars 20, hereinbefore described.

70 is an inclined and inclosed shelf secured on the bottom of the screen 62 to catch and deliver to a suitable box 70$^a$ or other receptacle any corn that may have been shelled from the ear while being husked.

71 represents a deflector secured above the snapping-rolls 13 14 to throw the stalks down on the table 29, and 72 a hood suitably hinged to the framework of the machine to cover the gearing for actuating the husking-rolls.

73 is a pulley keyed to the shaft 8, to which a belt may be run from an engine or horse power should it be desired to use the machine as a stationary husker.

Having thus described my invention, what I claim is—

1. In a corn-husker, one of each pair of husking-rolls journaled in swinging arms, and U-shaped springs inserted between each pair of swinging arms to normally hold the swinging roll against the other one, substantially as shown and described.

2. In a corn-husker, a crank-shaft journaled under the husking-rolls, one end of a shaking-screen mounted on said crank-shaft, the other end suspended by links suitably secured, ribs on said screen having projecting teeth, slats between said ribs inclining toward said crank-shaft, and a shelf under the screen slanting toward the delivery end of the screen and adapted to deliver into a box under the screen, substantially as shown and described.

3. In a corn-husker, a suitable stalk-feeder, snapping-rolls journaled to swing from and toward each other actuated by a U-shaped spring, husking-rolls arranged below said snapping-rolls, a conveyer to carry the husked corn from the husking-rolls, and a shaking-screen to separate shelled corn from the husks and separately deliver said husks and corn, substantially as shown and described.

4. In a corn-husker, a suitable stalk-feeder, snapping-rolls, husking-rolls arranged below said snapping-rolls, one of each pair of said husking-rolls journaled in pivoted arms, U-shaped springs to normally hold each pivotally-journaled roll against its mate, a suitable retarder suspended above said husking-rolls, a conveyer to carry the husked corn from the husking-rolls, and a shaking-screen beneath said husking-rolls, substantially as shown and described.

5. In a corn-husker, toothed feed-bars eccentrically journaled on a drive-shaft, snapping-rolls at the end of said feed-bars journaled to swing from and toward each other actuated by U-shaped springs, an inclined surface under said snapping-rolls to receive the ears, husking-rolls arranged at the end of said inclined surface, one of each pair of said husking-rolls journaled to move away from and toward its mate, a U-shaped spring to normally hold the two rolls in contact, an endless-belt conveyer at the end of said husking-rolls, and a shaking-screen mounted under said husking-rolls, substantially as shown and described.

6. In a corn-husker, a suitable stalk-feeder, snapping-rolls consisting of one smooth roll and one roll having longitudinal ribs thereon, one of said rolls journaled in swinging arms, U-shaped springs bearing against said arms, husking-rolls arranged below said snapping-rolls consisting of one smooth roll and one roll having a spiral rib thereon, a conveyer to carry the corn from the husking-rolls, and a shaking-screen to separate shelled corn from the husks and separately deliver said husks and corn, substantially as shown and described.

7. In a corn-husker, feed-bars eccentrically journaled on a drive-shaft, teeth on the upper edge thereof each having a vertical edge and a slanting edge, snapping-rolls at the end of said feed-bars, one of said snapping-rolls journaled in swinging arms, U-shaped springs bearing against said arms to normally hold said rolls in contact, husking-rolls below said snapping-rolls, one of each pair of husking-rolls journaled in swinging arms, U-shaped springs bearing against said arms to normally hold said rolls in contact, a suitable retarder above said husking-rolls, an endless-belt conveyer at the end of said husking-rolls, and a shaking-screen mounted under said husking-rolls, substantially as shown and described.

8. In a corn-husker, feed-bars eccentrically journaled on a drive-shaft, teeth on the upper edge thereof each having a vertical edge and a slanting edge, snapping-rolls at the end of said feed-bars, one of said snapping-rolls being journaled in swinging arms, U-shaped springs bearing against said arms to normally hold said rolls in contact, husking-rolls below said snapping-rolls, one of each pair of said husking-rolls journaled in swinging arms, U-shaped springs bearing against said arms to normally hold said rolls in contact, an endless-belt conveyer at the end of said husking-rolls, and a shaking-screen mounted under said husking-rolls, substantially as shown and described.

9. In a corn-husker, feed-bars eccentrically journaled on a drive-shaft, teeth on the upper edge thereof each having a vertical edge and a slanting edge, snapping-rolls at the end of said feed-bars, one of said snapping-rolls being journaled in swinging arms, U-shaped springs bearing against said arms to normally hold said rolls in contact, a longitudinal rib on one of said snapping-rolls, husking-rolls below said snapping-rolls, one of each pair of said husking-rolls journaled in swinging arms, U-shaped springs bearing against said arms to normally hold said rolls in contact, a spiral rib on one of each pair of husking-rolls, an endless-belt conveyer at the end of said husking-rolls, and a shaking-screen mounted under said husking-rolls, substantially as shown and described.

10. In a corn-husker, feed-bars eccentrically journaled on a drive-shaft, teeth on the upper edge of said feed-bars each tooth having a vertical edge and a slanting edge, snapping-rolls at the end of said feed-bars, one of said snapping-rolls journaled in swinging arms, a U-shaped spring to normally hold said swinging roll against the other roll, husking-rolls below said snapping-rolls, one of each pair of said husking-rolls journaled in swinging arms, a U-shaped spring to normally hold said swinging roll against the other roll, a conveyer at the end of said husking-rolls, and a shaking-screen beneath said rolls, substantially as shown and described.

In testimony whereof I hereto affix my signature in the presence of two witnesses.

JOSEPH HOVEY.

Witnesses:
WM. GASKEL,
SAMUEL JONES.